Oct. 25, 1938.  H. HIERTA  2,134,189
GAUGE
Filed Sept. 7, 1934

Inventor
HANS HIERTA.
By Milton Sikles
Attorney

Patented Oct. 25, 1938

2,134,189

UNITED STATES PATENT OFFICE 2,134,189

GAUGE

Hans Hierta, Dearborn, Mich., assignor to Packard Motor Car Company, Detroit, Mich., a corporation of Michigan Application September 7, 1934, Serial No. 743,119

11 Claims. (Cl. 73—11)

This invention relates to gauges and more particularly to gauges employed with motor vehicles.

The present trend in motor vehicle design is to place the indicator means of all the gauges in a position where they can be readily observed by the driver of the vehicle and it is customary to locate such indicator means on the instrument board. Until recently it has been the practice to arrange these indicators on the instrument board in a more or less widespread symmetrical manner but the present trend is to locate the indicator means in a close group. This close grouping of the indicators has been caused mainly by the desire to place the instruments in a position such that they can all be observed by the driver without looking along the length of the instrument board and also due to the utilization of the ends of the instrument board as storage compartments. In view of the large number of indicators and the desire to maintain them where they can be seen by the driver at a glance, difficulty has been found in finding adequate space on the instrument board.

It is an object of this invention to condense the space required on the instrument board of a motor vehicle for indicators through the provision of an indicator mechanism which can be selectively adjusted to be actuated by either one of two measuring mechanisms.

Another object of the invention is to provide a common indicator for selectively registering the quantity of oil or the quantity of gasoline carried by a motor vehicle.

A further object of the invention is to provide a common indicating mechanism which can be selectively associated in operative relation with either one of a pair of electrically actuated measuring mechanisms.

Other objects of the invention will appear from the following description taken in connection with the drawing, which forms a part of this specification, and in which.

Figure 1:
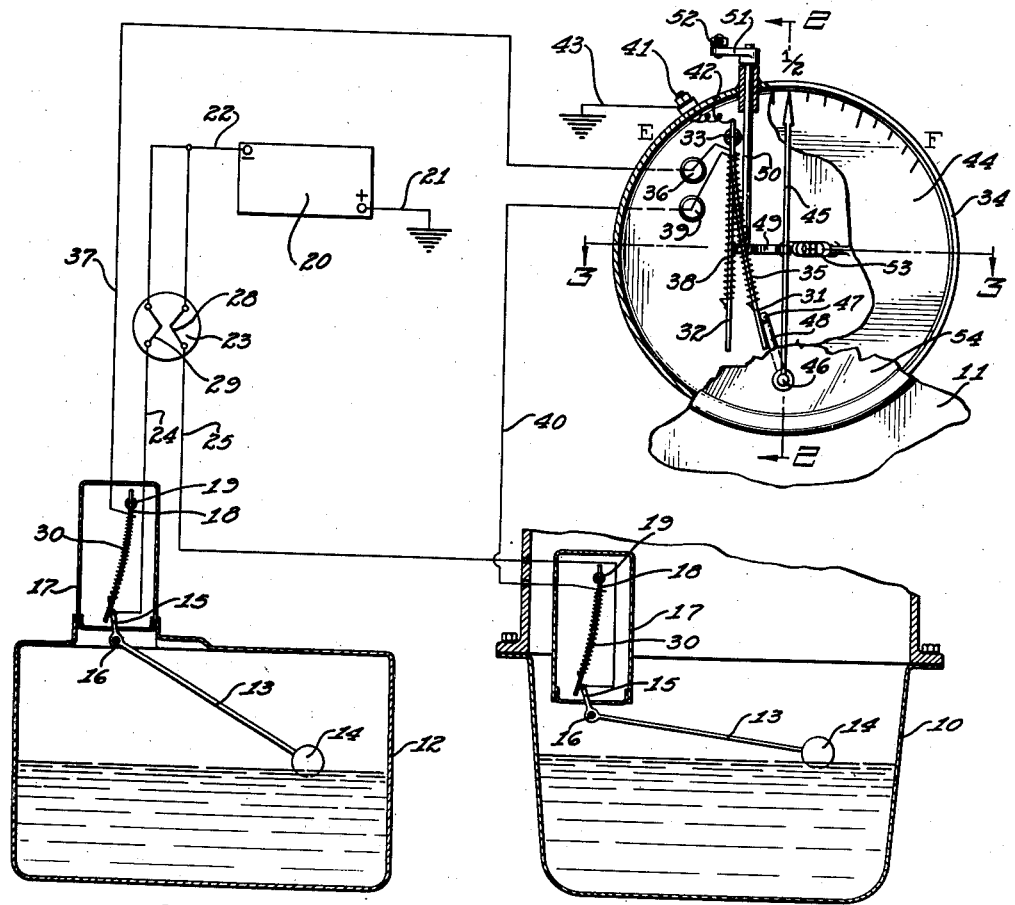
Fig. 1 is a diagrammatic representation of two fluid measuring mechanisms and an indicating mechanism therefor incorporating my invention.
Figure 2:
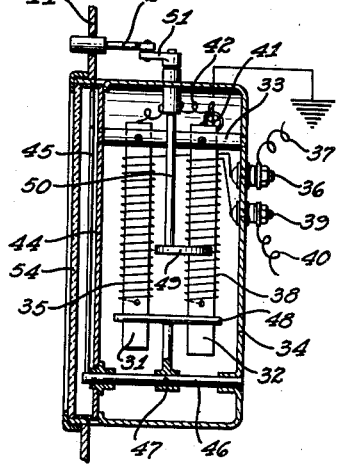
Fig. 2 is a sectional view taken on line 2—2 of the indicator mechanism.
Figure 3:
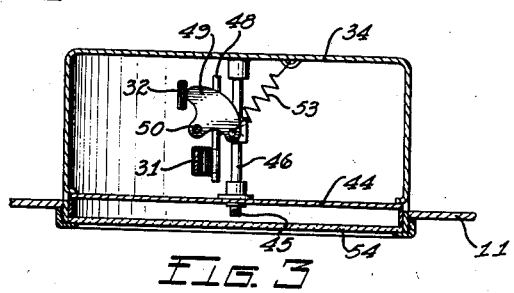
Fig. 3 is another sectional view of the indicator mechanism taken on line 3—3 of Fig. 1.

Referring now to the drawing by characters of reference, 10 indicates the crank case of an internal combustion engine employed as the motive power for driving a vehicle. In the vehicle is an instrument board 11 arranged forwardly of the driver in the conventional manner. The gasoline tank for supplying fuel to the motor is indicated at 12.

Separate but similar mechanism is associated with the crank case 10 and the tank 12 for measuring the quantity of fluid contained therein. Each of such mechanisms includes a lever 13 pivoted on a shaft 16. At the lower end of each lever there is provided a float 14 and at the upper end an arm 15. The arrangement is such that the floats will ride on the surface of the fluid in the crank case and the tank irrespective of the quantity which they may contain. Housings as indicated at 17 surround the arms 15 and extend some distance thereabove to enclose thermostatic elements 18 of bimetallic formation. These elements are fixed at their upper ends to shafts 19 carried by the housings and they normally extend in a straight vertical direction and are arranged in relation with the adjacent arms 15 so that they will always bear thereagainst in any position which the lever may assume.

The measuring mechanisms also include suitable electric means for heating the thermostatic elements 18. There is a battery 20 having a ground wire 21 and a feed wire 22. A connection 24 leads from the feed line to the arm 18 associated with the lever in the gasoline tank and a connection 25 leads from the feed line to the arm 15 associated with the float lever in the crank case. Interposed in the wiring connections 24 and 25 is a switch 23 having contacts 28 and 29 adapted to be turned to a position to control the flow of current through such connections. There is a wire coil 30 around each of the bimetallic elements 18 which is secured thereto at one end and forms a heating element when current passes therethrough.

The measuring mechanisms also each include means for actuating an indicator mechanism. A pair of bimetallic actuator members 31 and 32 are fixed at their upper ends to a shaft 33 carried by the indicator housing 34. Surrounding the member 31 is coiled a wire 35 which is secured at one end thereto and fastened to a terminal 36 at the other end. Wiring 37 forming an extension of the coil 30 around the bimetallic element associated with the float lever in the gasoline tank is also fixed to the terminal 36. Wiring 38 is coiled around the bimetallic member 32 and is secured at one end thereto, the other end being connected with a terminal 39. Wiring 40 forming an extension of the coil 30 associated with the bimetallic element cooperating with the float lever in the crank case is also connected with the terminal 39. The actuator elements 31 and 32 are connected with a terminal 41 by means of wiring 42 and this terminal has a ground wire 43 leading therefrom.

Indicator mechanism is carried by the housing 34 and the movable part thereof is mounted in a relation to be actuated by the members 31 and 32 of the measuring mechanisms. In the housing is a dial 44 in front of which is arranged an indicator 45 which is mounted on a rotatable shaft 46 carried within the housing. Fixed on the shaft is an arm 47 terminating in a cross bar 48. This cross bar lies in a relation to be engaged by the actuating members 31 and 32 so that either one of them can move the arm to rock the shaft 46 and the indicator 45 fixed thereon. In order that only one of the actuator members will be effective at a time, I provide selector mechanism operable to hold either one of the members out of effective operating relation with the cross bar 48. A cam 49 is mounted on the lower end of a shaft 50 which extends through the upper wall of the housing 34 and has connected to such end an arm 51 to which is pivotally attached a lever 52 projecting through the instrument panel 11 where it is readily accessible to the driver of the vehicle. The indicator and dial are enclosed in the housing by a transparent wall 54.

As it is most often desirable to know the content of the gasoline tank, means is associated with the selector mechanism for normally holding it in a relation to place the actuator member 32 associated with the oil measuring mechanism in an ineffective position. To this end, I provide a coil spring 53 which is fixed at one end to the housing 34 and at the other end to the cam member 49. The spring normally holds the cam member in a position such that one end engages the bimetallic element 32 and holds it in a position such that it will not cooperate with the cross bar 48 on the indicator control arm 47.

Assuming that the switch 23 disconnects the battery from the arms 15, then the bimetallic elements 18 will be cold and will extend in a straight vertical line except as bent by the positions of the arms 15. When the switch 23 is on, then electricity will flow through the wires 24 and 25 to the coils 30 and to wiring 37 and 40 and the coils 35 and 38. The members 18 form the contact between the arms 15 and the coils 30 to establish the circuits. After a current has been passing through the coils, their resistance character will cause the elements 18 to become heated and to bend so that they will move away from the arms 15 breaking the electrical flow. After moving out of engagement with the arm 15, the bimetallic elements will quickly cool off and will move back into engagement with the arms 15 whereupon the circuits are again established and the same operations are repeated as long as the switch 23 is on. This making and breaking of the circuits through movement of the elements 18 to and from the arms 15 is of a character such that fluctuation of the indicator mechanism is not noticeable. The initial position in which the elements 18 are held by the arms 15 when the switch is first turned on determines the time required to heat the elements so that they will move out of contact with the arms 15 and, as the coils 35 and 38 heat up simultaneously with the coils 30, the position of the indicator means will be thereby controlled in accordance with the level of the fluid in the tank and the crank case.

In the normal position of the measuring mechanisms, the spring 53 acts upon the selector cam 49 so that it holds the actuator element 32 out of operating relation with the indicator mechanism and consequently the indicator will show the quantity of fluid in the gasoline tank. When the driver wants to know the quantity of oil in the crank case, then he pushes the lever 52 forwardly which will rotate the arm 51 and shaft 50 fixed thereto carrying the cam 49 away from the member 32 and pressing the member 31 into a relation such that it will not cooperate with the cross bar 48. Under such circumstances, the member 32 will be free to control the position of the cross bar of the indicator mechanism to show the quantity of oil in the crank case. After the driver has observed the position of the indicator and determined the quantity of oil in the crank case, then he can release the lever 52 and the spring will move the cam 49 back into position where the member associated with the gasoline measuring mechanism will again be effective.

It will be seen that a single indicator mechanism is required for the driver to determine the quantity of fluid in either the oil pan or the gasoline tank so that the space required for a reading of the oil and gasoline measuring mechanisms is materially reduced.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a gauge, the combination of mechanism movable in response to a fluid level, a second mechanism movable in response to another fluid level, indicator means arranged to be actuated by the movement of said mechanisms, and means engageable with said mechanisms, to hold either out of actuating relation with the indicator means.

2. In a gauge, the combination of a rotatably mounted shaft, an indicator fixed on the shaft, an arm fixed to the shaft, a pair of gauge mechanisms flexibly engaging said arm to move the indicator into indicating position, and means for flexing either one of said mechanisms out of engaging relation with said element.

3. A gauge device comprising movable indicator means, a pair of movably mounted members normally effective to flexibly actuate said indicator means, and selector means for holding either one of said members out of actuating relation with said indicator means.

4. A gauge device comprising movable indicator means, a pair of resilient members normally effective to actuate said indicator means, and means for selectively springing either one of said members out of actuating relation with said actuating means.

5. A gauge device comprising movable indicator means, a pair of fixed resilient bimetallic members arranged to normally flex against said indicator means, and means operable to selectively move either one of said members out of engaging relation with said indicator means.

6. A gauge device comprising a movable indicator means, flexibly operative means normally engaging and urging said means into indicating position, and means for holding said flexibly operative means away from said indicator means.

7. In a gauge, the combination with an indicator means, of actuator means for said indicator means comprising two electrically flexed members engaging and actuating said indicator means, and selector means operable to displace either of said members from indicator engaging and actuating position.

8. In a gauge, the combination of indicator means, a pair of thermostatically controlled members movably mounted to engage and actuate said indicator means, and means for moving and holding either of said members out of engaging relation with said indicator means.

9. In a gauge, the combination of indicator means, a pair of movable electrically controlled members flexed to engage and actuate said indicator means, and means operable to move either of said members out of actuating relation with said indicator means.

10. In a gauge, the combination of indicator means, a pair of mechanisms associated to actuate said indicator in accordance with the quantity of fluid at two sources, a cam operable to move either of said mechanisms out of operating relation with said indicator means, means manually operable to turn said cam, and a spring normally urging said cam into a position holding one of said mechanisms out of operative relation with said indicator means.

11. In a gauge, the combination of a pivoted indicator element, a pair of electrically flexed members associated to directly engage and rock said indicator element on its pivot in accordance with the quantity of fluid at two sources, and a remotely controlled cam means operable to selectively engage and move either of said mechanisms out of relation to rock said indicator element.

HANS HIERTA.